United States Patent

Egan et al.

[11] 3,833,499
[45] Sept. 3, 1974

[54] HYDROCONVERSION PROCESS

[75] Inventors: Clark J. Egan, Piedmont; Robert J. White, Pinole, both of Calif.

[73] Assignee: Chevron Research Company, San Francisco, Calif.

[22] Filed: Apr. 30, 1973

[21] Appl. No.: 355,396

Related U.S. Application Data

[63] Continuation-in-part of Ser. No. 129,986, March 31, 1971, Pat. No. 3,769,235.

[52] U.S. Cl.................... 208/111, 208/59, 208/68, 252/455 Z, 252/460, 252/477 R
[51] Int. Cl....................... C10g 13/04, B01j 11/40
[58] Field of Search....................................208/111

[56] References Cited
UNITED STATES PATENTS

| | | | |
|---|---|---|---|
| 3,243,368 | 3/1966 | Mulaskey | 208/111 |
| 3,453,204 | 7/1969 | Mulaskey | 208/111 |
| 3,499,853 | 3/1970 | Hansford | 208/111 |
| 3,547,808 | 12/1970 | Hansford | 208/111 |
| 3,769,235 | 10/1973 | White et al. | 252/455 |

*Primary Examiner*—Delbert E. Gantz
*Assistant Examiner*—G. E. Schmitkons
*Attorney, Agent, or Firm*—G. F. Madgeburger; R. H. Davies

[57] ABSTRACT

A hydrocracking process using a palladium-zeolite-amorphous inorganic oxide catalyst containing 1 to 40 weight percent zeolite and wherein the catalyst is prepared by impregnating palladium into the zeolite, combining the impregnated zeolite with the amorphous inorganic oxide, and impregnating at least the amorphous inorganic oxide with palladium. Preferably the catalyst is calcined at 1,000° to 1,800°F. The catalyst is found to be especially effective in hydrocracking high end point feeds with surprisingly low buildup of heavy ends in the recycle stream.

13 Claims, 5 Drawing Figures

HYDROCONVERSION PROCESS

CROSS-REFERENCE TO RELATED APPLICATION

This application is a continuation-in-part of our application Ser. No. 129,986, filed Mar. 31, 1971 (now U.S. Pat. No. 3,769,235); the disclosure of Ser. No. 129,986 is incorporated herein by reference.

BACKGROUND OF THE INVENTION

The present invention relates to hydrocracking using a zeolite-containing catalyst, more particularly hydrocracking using a catalyst containing zeolite, palladium and an amorphous inorganic oxide.

Hydrocracking is well known in the art. In a hydrocracking process, a hydrocarbon feedstock is cracked in the presence of hydrogen to yield more valuable lower molecular weight products. Typical operating conditions for catalytic hydrocracking include a temperature between 500° and 900°F, a pressure between 100 and 10,000 psig, a hydrogen rate between 100 and 10,000 SCF per barrel of feed, and the use of a catalyst typically containing a Group VIB and/or Group VIII hydrogenation component on a porous carrier.

The use of zeolites in hydrocracking catalysts has been disclosed in numerous prior art references. The term "zeolite" is used herein in its normal sense as used in the petroleum refining industry. The term "zeolite" is used herein to mean crystalline aluminosilicate molecular sieves, for example, mordenite, faujasite, erionite, chabazite, so-called zeolite Y, zeolite X, etc. There are numerous references on zeolites, see, for example, "Zeolite Frameworks" by W. M. Meier and D. H. Olson, Second International Conference on Molecular Sieve Zeolites, Sept. 8–11, 1970, American Chemical Society Paper, pp. 386–399 and, also, "Active Sites in Zeolite Catalysts" by W. O. Haog, April 8–13, 1973, ACS Paper, pp. 247–249.

There are also well-known procedures in the art for enhancing the catalytic activity of zeolites by removing sodium or the like by ion exchange, for example, by exchanging ammonium ions for sodium or exchanging rare earth elements for sodium or by exchanging portions of both of the foregoing ions for sodium ions. Upon calcining an ammonium exchanged zeolite, ammonia is driven off and the zeolite is converted at least in part to the "hydrogen form." Synthetic zeolites and decationized or hydrogen forms of zeolites, for example, a hydrogen form of zeolite Y, are described in U.S. Pat. No. 3,130,006. The X type zeolites, described for example in U.S. Pat. No. 3,882,244, have an $SiO_2/Al_2O_3$ ratio of only about 2.5 and, it appears, cannot be appreciably decationized without destroying their crystal structure, but such zeolites may be stabilized with rare earth metals as described for example in U.S. Pat. No. 3,140,253.

U.S. Pat. No. 3,499,835 is directed to "Hydrocracking Ammonia-Containing Hydrocarbons in the Presence of a Catalyst Comprising a Group VIII Metal Deposited on a Rare-Earth Exchange X Zeolite." U.S. Pat. No. 3,499,835 discloses that the hydrocracking catalyst can contain inorganic oxide adjuvants and that suitable adjuvants include, for example, activated alumina, silica gel, alumina-silica cogels containing about 1–30 percent by weight of $SiO_2$, silica-alumina cogels containing 50–90 percent of $SiO_2$, magnesia, titania, zirconia, clays (preferably acid washed), rare earth oxides, chromium oxides, and the like; and that these materials may either be employed as such, or a minor proportion of a Group VIII metal hydrogenating component may be impregnated thereon. All of the working examples in U.S. Pat. No. 3,499,835 are of hydrocracking catalysts which do not contain any amorphous inorganic oxide component. Feedstocks hydrocracked in accordance with the working examples of U.S. Pat. No. 3,499,835 were hydrofined feeds having a boiling range from 390° to 860°F.

The hydrocracking step of the process disclosed in U.S. Pat. No. 3,499,835 includes a recycle of a heavy bottoms fraction obtained by distilling the effluent from the hydrocracking reaction zone.

U.S. Pat. No. 3,547,808 discloses hydrocracking catalysts consisting of a copelleted, particle-forming mixture of (1) a crystalline, zeolitic aluminosilicate component (typically a molecular sieve zeolite), the ion exchange capacity thereof being satisfied mainly by hydrogen ions and/or polyvalent metal ions, and containing a minor proportion of a Group VIII metal added thereto by ion exchange, and (2) an amorphous component comprising a predominant proportion of a porous, amorphous support and a minor proportion of at least one constituent exhibiting hydrogenation activity. U.S. Pat. No. 3,547,808 further discloses that the hydrogenating metal which is added to the amorphous support may be the same as or different from the hydrogenating promoter used on the aluminosilicate component, and it may be added in minor proportions of, for example, 0.1–25 percent by weight; and that suitable additional metals include the Group VIB metals and their oxides or sulfides, particularly molybdenum and tungsten. The U.S. Pat. No. 3,547,808 discloses that the amorphous hydrogenation component is particularly desirable in connection with the treatment of high end point feedstocks boiling above about 650°F and up to about 1,200°F; and that the heavy polycyclic materials in the high end point feedstocks tend to plug the pores of the zeolitic aluminosilicates, but may be effectively hydrogenated, and hydrocracked if desired, by contact with the active hydrogenating surface area of the amorphous support modified by the incorporation of a hydrogenating promoter. The U.S. Pat. No. 3,547,808 discloses that this is feasible in view of the larger average pore diameter of the amorphous support, which will ordinarily range between about 50 and 150 Angstroms; and that the hydrogenating promoter is preferably added, as by impregnation, to the amorphous support before incorporation of the aluminosilicate component.

U.S. Pat. No. 3,547,808 further discloses seven exemplary catalysts containing palladium-zeolite and nickel or cobalt-amorphous inorganic oxide wherein the zeolite content is from 50 parts to 25 parts; no working exemplary hydrocracking data is given for these seven catalysts. Working examples I–IV of U.S. Pat. No. 3,547,808 disclose hydrocracking results using 100 percent palladium-zeolite; 85 percent palladium-zeolite, 15 percent nickel-clay; 50 percent palladium-zeolite, 50 percent molybdenum-magnesia; and six varying amounts of palladium-zeolite with palladium on alumina ranging from 100 percent palladium-zeolite to 50 percent palladium-zeolite.

U.S. Pat. No. 3,547,808 does not disclose or teach toward hydrocracking using palladium-zeolite, palladium-amorphous inorganic oxide hydrocracking catalyst containing less than 40 weight percent palladium-zeolite.

SUMMARY OF THE INVENTION

According to the present invention a process for hydrocracking a hydrocarbon feedstock is provided which process comprises contacting the feedstock under hydrocracking conditions with a hydrocracking catalyst comprising palladium or a palladium compound on a carrier comprising an amorphous inorganic oxide and between 1 and 40 weight percent zeolite and wherein the catalyst is prepared by steps comprising impregnating palladium or a palladium compound into the zeolite, combining the impregnated zeolite with the amorphous inorganic oxide, and impregnating at least the amorphous inorganic oxide with palladium or a palladium compound.

Among other factors the present invention is based on the unexpected superior performance found in hydrocracking using a catalyst having a low zeolite content and prepared in accordance with the present invention wherein all the palladium is not added to one of the catalyst carrier materials before the zeolite and amorphous inorganic oxide carrier materials are combined and also all the palladium is not added after the carrier materials are combined.

In accordance with the present invention the palladium can be impregnated into the amorphous inorganic oxide before mixing the amorphous inorganic oxide with the palladium-zeolite material.

However, we have found especially outstanding hydrocracking performance results from our hydrocracking catalyst when the palladium or palladium compound is impregnated into the amorphous inorganic oxide after the amorphous inorganic oxide is combined with the palladium impregnated zeolite. Palladium impregnation of the amorphous inorganic oxide material after the amorphous inorganic oxide is combined with the zeolite will, of course, result in some of the palladium depositing on the zeolite. In fact, we have observed that palladium impregnation into a mixture of zeolite and amorphous inorganic oxide material results in the palladium depositing predominantly on the zeolite material. We prefer to have more palladium on the zeolite material than on the amorphous material in our catalyst, but there must be some palladium on the amorphous material in our catalyst.

The ratio of palladium on zeolite to palladium on amorphous material is preferably between 1.1:1 and 10:1. Preferably the ratio is at least 1.5:1 and ratios of the palladium on zeolite to palladium on amorphous material between 3.5:1 and 7.0:1 have been found to give especially outstanding hydrocracking performance for our hydrocracking catalyst. These ratios are calculated based on weight percent palladium on the zeolite compared to that on the amorphous material.

Although our invention is not to be limited by any theory of operation, we postulate that the relatively high amount of palladium on the zeolite in our catalyst is necessary to hydrogenate would-be poisonous materials which come off the highly active zeolite cracking component of our catalyst and that palladium on the amorphous material is desirable to provide better overall hydrogenation balance, and, furthermore, that improved palladium distribution on "internal" catalyst sites is achieved by our catalyst preparation method wherein not all the palladium is added at the beginning nor at the end of the catalyst preparation procedure. As will be seen from our data hereinbelow, the zeolite content of our catalyst is also of prime importance.

Preferably the hydrocracking catalyst contains a total of 0.2 to 8.0 weight percent palladium and 0.15 to 5.0 weight percent palladium on the zeolite and from 0.1 to 3.0 weight percent palladium on the amorphous inorganic oxide. The reference to a given weight percent palladium on the zeolite is used herein to mean that there is that given weight percent of palladium calculated on the basis of the zeolite rather than on the basis of the entire catalyst. Thus, 5 weight percent palladium on the zeolite means that there are 5 parts weight palladium per 100 parts weight of zeolite. Also it is to be understood that although the palladium is calculated on an elemental palladium basis, the palladium can be in the form of various compounds such as palladium oxide or palladium sulfide. The foregoing comments also apply to the terminology of weight percent palladium on the amorphous inorganic oxide.

At some places herein, the description "palladium or a palladium compound" is used but this is not to connote that in those instances where reference is simply made to the term "palladium," that only the pure element palladium is intended; use of the term "palladium" includes instances where palladium may be present in compound form.

Amorphous inorganic oxides which can be used in the process of the present invention include porous refractory materials such as alumina, silica, magnesia, zirconia, hafnia and the like and including various mixtures of the foregoing. Alumina, silica and alumina-silica are especially preferred amorphous inorganic oxide carrier materials for the catalyst used in the process of the present invention. Alumina-silica amorphous inorganic oxide carrier materials or matrices such as described in our copending application Ser. No. 129,986 are especially preferred for our hydrocracking catalyst.

Preferably the catalyst is calcined at a temperature greater than 1,000°F and the use of calcination temperatures between 1,200° and 1,800°F for one-half to 24 hours, preferably 1 to 10 hours, is especially preferred. The foregoing calcination or thermactivation treatment is applied preferably using an oxygen-containing atmosphere such as air and the thermactivation treatment is applied to the entire catalyst preparation containing the palladium, zeolite, and the amorphous inorganic oxide. Earlier heat treatments or calcinations can be given to the zeolite and/or amorphous inorganic oxide materials but we prefer to combine the amorphous inorganic oxide material with the zeolite material before the amorphous inorganic oxide material has been calcined.

The zeolite portion of the catalyst must be less than 40 weight percent of the catalyst. Preferably the zeolite is between 5 and 30 weight percent and we have found especially good hydrocracking results are achieved when the zeolite content of the catalyst is between 10 and 25 weight percent.

The catalyst of the present invention is especially advantageously used to process high end point feeds in contrast to low end point feeds such as light naphthas. Thus, exemplary preferred feeds for the hydrocracking process of the present invention include catalytic cracker cycle oils boiling within the range 400° to 900°F, gas oils or diesel oils boiling within the range 350° to 700°F, and light and heavy gas oils from vacuum distillation units boiling within a range of from about 550° up to about 1,100°F. It should be understood that the terminology "boiling within a range of 550° to 1,150°F" includes feedstocks boiling inside that range, for example, from 800° initial point to 1,000°F final point. Preferred high end point feedstocks for the present invention have an ASTM D—1160 95 volume percent boiling point (95 percent overhead) of 750°F or above.

FURTHER DESCRIPTION OF DRAWINGS AND EXAMPLES

Figure 1:
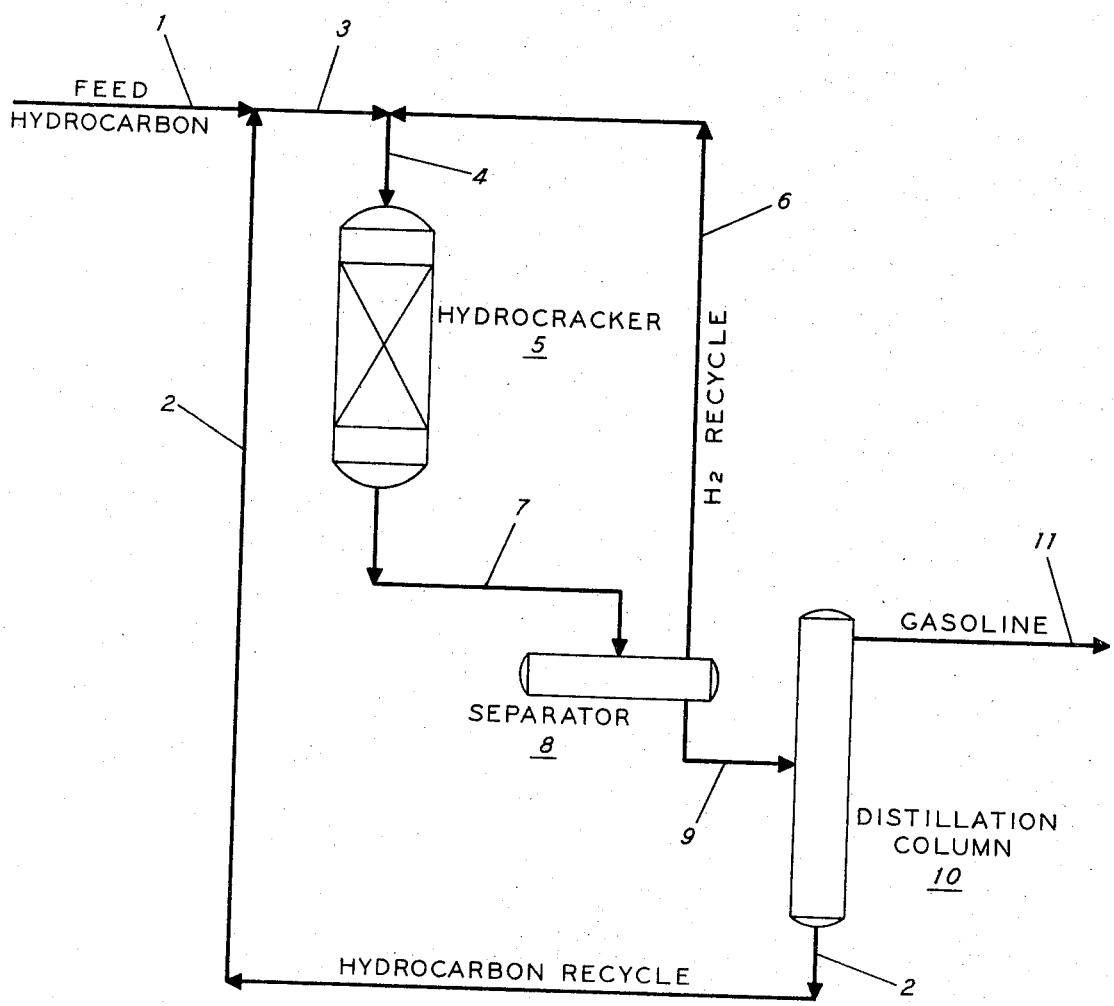
FIG. 1 is a schematic process flow diagram illustrating a preferred embodiment of the present invention.

Referring to FIG. 1, feed hydrocarbon in line 1 and recycle hydrocarbon in line 2 are combined and passed via lines 3 and 4 to hydrocracker 5. Hydrogen recycle gas is also fed to the hydrocracker reactor vessel via lines 6 and 4. Effluent from the hydrocracker is withdrawn via line 7 and introduced to separator 8. Hydrogen recycle is withdrawn as a vapor stream via line 6 from separator 8 and liquid material including lower molecular weight hydrocracked components is withdrawn via line 9 from separator 8. It will, of course, be understood that the process flow diagram is schematic only and also is highly simplified, omitting many of the conventional and well-known features of hydrocracking operation such as multiple separation steps and recycle booster pumps such as the recycle booster pump that would be used for the hydrogen recycle via line 6.

The liquid hydrocarbon material in line 9 is introduced to distillation column 10. In distillation column 10 a gasoline fraction is shown as fractionated overhead and withdrawn via line 11, and hydrocarbon recycle which includes heavy bottoms material is shown withdrawn via line 2 from the distillation column. Again the distillation column only schematically indicates the distillation or fractionation which can be applied to the hydrocracker effluent. In actual operation various alternative fractionation schemes can be used and various produce hydrocarbon fractions can be obtained.

Figure 2A:
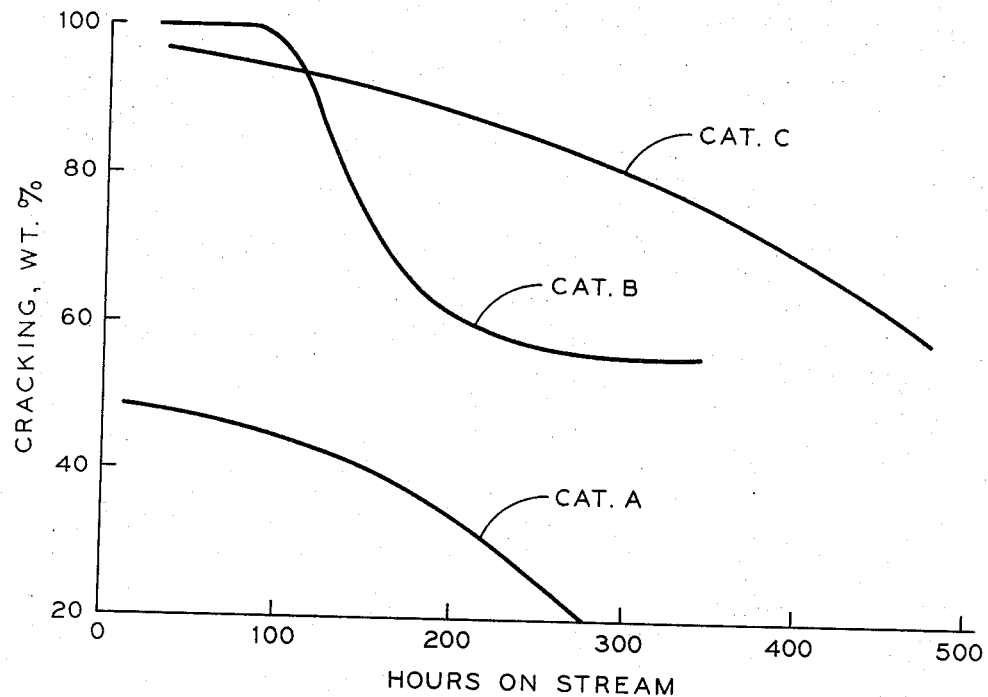
FIGS. 2A and 2B show n-butylbenzene hydrocracking data, n-butylbenzene breakthrough times, and hydrocracking activity for three comparative catalysts, catalyst C being in accordance with the present invention.
Figure 2B:
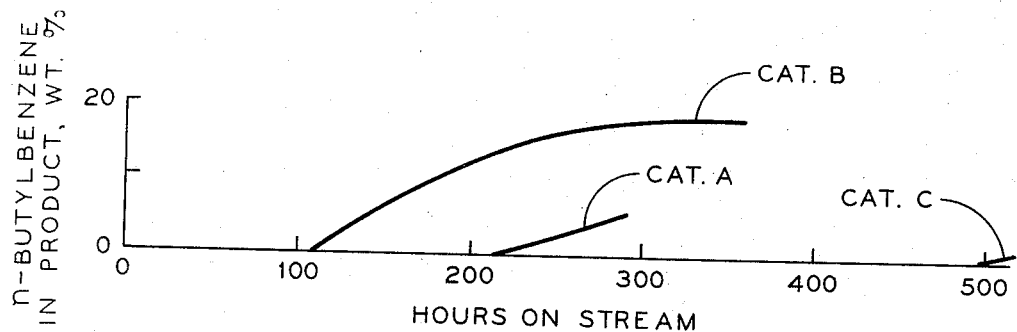

FIG. 2A shows weight percent cracking of an n-butylbenzene feedstock versus onstream time for three different hydrocracking runs using, respectively, catalysts A, B and C. FIG. 2B shows weight percent n-butylbenzene in the product versus onstream time for three different hydrocracking runs using, respectively, catalysts A, B and C.

The data for FIGS. 2A and 2B was generated under the following hydrocracking reaction conditions:

| | |
|---|---|
| Temperature | 575°F |
| Pressure | 1200 psig |
| Hydrogen feed rate | 7,000 SCF/Bbl. |
| Liquid hourly space velocity | 4.0 |
| Feedstock | n-butylbenzene containing about 1.2 to 1.3 ppm sulfur |

Table I below is a tabulation giving the catalyst description for catalysts A, B and C used in the respective hydrocracking runs. (The palladium content of the zeolite portion and the matrix portion is not known as accurately as the palladium content of the whole catalyst. Table I is qualitatively correct although the quantitative material balance for palladium does not check out.)

TABLE I

| | Catalyst A | Catalyst B | Catalyst C | Catalyst D |
|---|---|---|---|---|
| Density, g/cc | 0.64 | 0.56 | 0.85 | 0.78 |
| Area, m²/g | 369 | 626 | 379 | 476 |
| Pd, % | 0.47 | 0.53 | 0.70 | 0.68 |
| Zeolite, % | 30 | 65 | 20 | 30 |
| Pd, % in Zeolite | 2 | 1.0 | 1.76 | 1.20 |
| Pd, % in Matrix | 0.45 | 0.57 | 0.34 | 0.37 |
| Pd Zeolite / Pd Matrix | 4.5 | 2 | 5 | 3 |
| Calcination Temp., °F | 1000 | 1000 | 1000 | 1000 |
| When Pd added | After combining zeolite and amorphous materials | To zeolite before combining. Also after combining zeolite and amorphous materials | → | → |

Catalyst C, the catalyst especially preferred in the process of the present invention, was prepared as follows:

1. Impregnation of zeolite:

Dissolve 0.4 g. of palladium tetramminodinitrate in 25 ml. $H_2O$. Slowly add this solution to 28 g. of rare earth-exchanged zeolite. Mix thoroughly and dry on steam plate to original weight.

2. Impregnation of mixture of amorphous material plus zeolite:

Dissolve 1.55 g. of palladium tetramminodinitrate in 50 ml. $H_2O$. Mix in a Waring blender 403 g. of a washed silica-alumina cogel (60 percent $Al_2O_3$, about 40 percent silica, and a 25 percent solid content) together with the 28 g. of impregnated zeolite described above. Add 310 ml. $H_2O$ while mixing at low speed for 10 minutes. Then add the 50 ml. of the palladium solution and mix for 5 minutes more.

3. Drying and calcining:

Dry overnight in a Pyrex dish. Calcine in a Vycor tube in a furnace with 140 ml./minute of dry air for 4 hours at 450°F and 8 hours at 1,000°F. Another 2 hours at 1,400°F is preferred, although 1,400°F treatment was not used in the preparation of catalyst C.

The n-butylbenzene feedstock used in the hydrocracking runs with catalysts A, B and C affords a means of measuring hydrocracking ability and hydrogenation ability. As can be seen from FIGS. 2A and 2B, catalyst C (the catalyst in accordance with the present invention) gave superior results in terms of both cracking and hydrogenation. Catalyst A gave low conversion or low cracking of the feed as can be seen for the cracking curve in FIG. 2A for catalyst A versus catalyst C. For example, after 100 hours of onstream time the weight percent cracking with catalyst A was about 45 weight percent whereas with catalyst C the weight percent cracking was about 94 weight percent. Also the hydrogenation activity of catalyst C is much better than that of catalyst A. After about 210 hours of onstream hydrocracking time with catalyst A, n-butylbenzene began to "break through" but with catalyst C n-butylbenzene had not broken through even after 480 hours of onstream operation. The n-butylbenzene breakthrough is due to insufficient activity to hydrogenate essentially all of the n-butylbenzene.

Catalyst A was prepared by adding all of the palladium to the catalyst after combining the zeolite and amorphous inorganic oxide materials. Catalyst B was prepared by adding palladium to the zeolite, then combining the palladium-zeolite with amorphous inorganic oxide material, and then adding more palladium. However, catalyst B contains 65 weight percent zeolite.

As can be seen from FIG. 2A, catalyst B gave high cracking activity at the beginning of the hydrocracking run but after about 100 hours of onstream time the cracking activity began dropping from 90 weight percent cracking to about 60 weight percent cracking at 200 hours of onstream time. By contrast, catalyst C achieved about 94 weight percent cracking of n-butylbenzene at 100 hours and dropped only to about 90 percent cracking at 200 hours. Also catalyst C was surprisingly better than calalyst B in hydrogenation activity. With catalyst B, breakthrough of n-butylbenzene occurred at about 110 hours as can be seen from the catalyst B curve in FIG. 2B. However, as indicated previously, even after 480 hours of onstream time n-butylbenzene breakthrough had not occurred with catalyst C.

Figure 3:
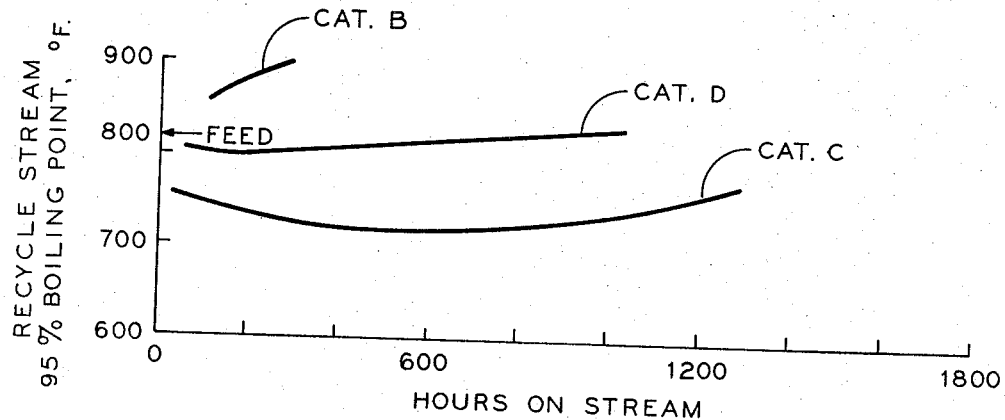
FIG. 3 shows the change with onstream time of hydrocracked recycle stream 95 percent boiling point for three different runs with different catalysts.

The superior hydrogenation activity of the catalyst in accordance with the present invention is also reflected in avoidance of buildup of heavy ends in the recycle hydrocarbon stream to a hydrocracker. This is illustrated by FIG. 3. The ordinate in FIG. 3 is the 95 percent boiling point for the recycle stream and the abscissa is the hours onstream time. FIG. 3 presents recycle stream 95 percent boiling point data from three hydrocracking runs, the runs being, respectively, with catalysts B, C and D. Catalyst C contains 20 percent zeolite and is a preferred catalyst in accordance with the present invention and is the same catalyst C as previously referred to in connection with FIGS. 2A and 2B. Catalyst D contains 30 weight percent zeolite and also is a catalyst in accordance with the present invention. Catalyst B contains 65 weight percent zeolite and is not a catalyst in accordance with the present invention. All the catalysts were prepared in the manner previously described for catalyst C except, of course, different amounts of zeolite were used. The description of catalysts B, C and D is given in Table I above.

The hydrocracking conditions used to generate the data graphically depicted by FIG. 3 were as follows:

| | |
|---|---|
| Temperature | 620°F |
| Pressure | 1300 psig |
| Hydrogen feed rate | 5,600 SCF/Bbl. |
| Liquid hourly space velocity | 6 |
| Feed | 400–850°F boiling range hydrofined gas oil |
| Conversion | 60 percent per pass conversion to material boiling below 400°F |

As can be seen from FIG. 3, catalyst C was the most successful in maintaining a low 95 percent point for the recycle stream. Catalyst C had an unexpectedly superior ability for hydrocracking heavy components compared to the ability of catalyst B. Catalyst B had a very steep rate of increase in heavy ends which caused the 95 percent boiling point of the recycle to go up steeply. This is a self-accelerating phenomenon because as the heavy ends build up, the catalyst becomes increasingly fouled and the per pass unconverted heavy ends increase as the extent of catalyst fouling increases. Thus, it is seen that the catalyst of the present invention is especially advantageously employed in hydrocracking operations wherein there is a recycle of unconverted material in the effluent from the hydrocracking reaction zone back to the feed to the hydrocracking zone. Avoidance or reduction of buildup of heavy ends in the recycle hydrocarbon stream to a hydrocracking process is especially important when processing relatively heavy hydrocarbon feeds because in these instances buildup of heavy ends is most likely to be a severe problem.

Referring again more particularly to FIG. 3, it is seen that catalyst D did not perform quite as well as catalyst C, but catalyst D did perform reasonably well; after 1,000 hours of onstream time the rate of increase in heavy ends (rate of increase in recycle stream 95 percent boiling point) is seen to be not much different than that with catalyst C. Catalyst D as indicated previously is a catalyst in accordance with the present invention although catalyst C is an especially preferred catalyst in accordance with the present invention.

Figure 4:
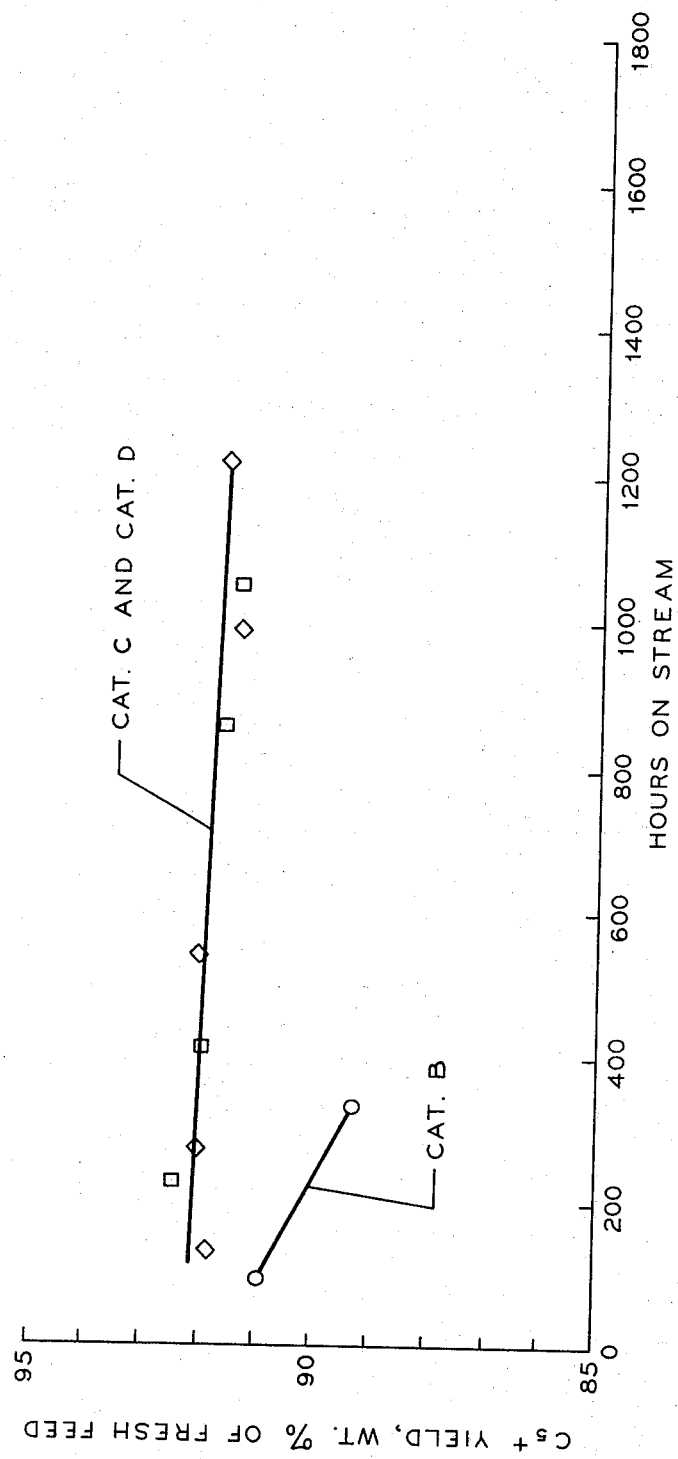
FIG. 4 shows the change with onstream time of $C_5+$ yield for three different runs with different catalysts.

Another surprising advantage of the hydrocracking process in accordance with the present invention is the high yield stability of low yield decline rate. FIG. 4 shows that catalysts containing 20–30 percent zeolite and prepared in accordance with the present invention (catalysts C and D) gave a much lower rate of $C_5+$ yield decline than does catalyst B in hydrocracking service. Thus, the process of the present invention using catalysts such as catalysts C and D achieves:

1. high hydrocracking activity — see FIG. 2A
2. low rate of decline in hydrocracking activity — see FIG. 2A
3. persistent hydrogenation activity — see FIG. 2B
4. high activity for hydrocracking heavy ends in recycle stream — see FIG. 3
5. low rate of decline in activity for hydrocracking heavy ends in recycle stream — see FIG. 3, and
6. low rate of $C_5+$ yield decline — see FIG. 4.

The data for FIG. 4 were generated under the following conditions:

| | |
|---|---|
| Feed | 850°F end point hydro-denitrified gas oil |
| Liquid hourly space velocity | 6 |
| Pressure | 1300 psig |
| Temperature and conversion | Temperature adjusted to maintain 60% per pass conversion to material boiling below 400°F |
| Hydrogen feed rate | 7,000 SCF/Bbl. |

Both catalysts C and D, which were used in the hydrocracking runs which gave the data plotted along the upper line in FIG. 4, were prepared using rare earth exchanged zeolites, in particular zeolite Y. Preferably the zeolite component of the catalyst used in the present invention is a rare earth exchanged zeolite. Suitable rare earth exchanged elements, that is, elements which may be exchanged for sodium in the zeolite, include lanthanum, cerium and neodymium.

What is claimed is:

1. A process for hydrocracking a hydrocarbon feedstock which comprises contacting the feedstock under hydrocracking conditions with a hydrocracking catalyst comprising palladium or a palladium compound on a carrier comprising an amorphous inorganic oxide and between 1 and 40 weight percent zeolite and wherein the catalyst is prepared by steps comprising impregnating palladium or a palladium compound into the zeolite, combining the impregnated zeolite with the amorphous inorganic oxide, and impregnating at least the amorphous inorganic oxide with palladium or a palladium compound.

2. A process in accordance with claim 1 wherein the palladium or palladium compound is impregnated into the amorphous inorganic oxide after the amorphous inorganic oxide is combined with the impregnated zeolite.

3. A process in accordance with claim 1 wherein the palladium or palladium compound is impregnated into the amorphous inorganic oxide before the amorphous inorganic oxide is combined with the impregnated zeolite.

4. A process in accordance with claim 2 wherein the hydrocracking catalyst contains a total of 0.2 to 8.0 weight percent palladium and 0.15 to 5.0 weight percent palladium on the zeolite and from 0.10 to 3.0 weight percent palladium on the amorphous inorganic oxide.

5. A process in accordance with claim 2 wherein the catalyst contains from 0.4 to 2.0 weight percent palladium on the zeolite and from 0.2 to 1.0 weight percent palladium on the amorphous inorganic oxide and wherein the ratio of the palladium on the zeolite to the palladium on the amorphous inorganic oxide is at least 1.5.

6. A process in accordance with claim 2 wherein the amorphous inorganic oxide is alumina, silica or alumina-silica.

7. A process in accordance with claim 6 wherein the amorphous inorganic oxide is alumina-silica.

8. A process in accordance with claim 7 wherein the catalyst is calcined at 1,000°F to 1,800°F.

9. A process in accordance with claim 8 wherein the catalyst is calcined at a temperature between 1,200° and 1,800°F.

10. A process in accordance with claim 2 wherein the hydrocarbon feedstock is a high end point fraction having an ASTM D—1160 95 volume percent boiling point above 750°F.

11. A process in accordance with claim 1 wherein the amount of zeolite in the hydrocracking catalyst is between 5 and 30 weight percent.

12. A process in accordance with claim 2 wherein the amount of zeolite in the hydrocracking catalyst is between 10 and 25 weight percent.

13. A process in accordance with claim 11 wherein the zeolite is a rare earth exchanged zeolite.

* * * * *